Patented Feb. 23, 1932

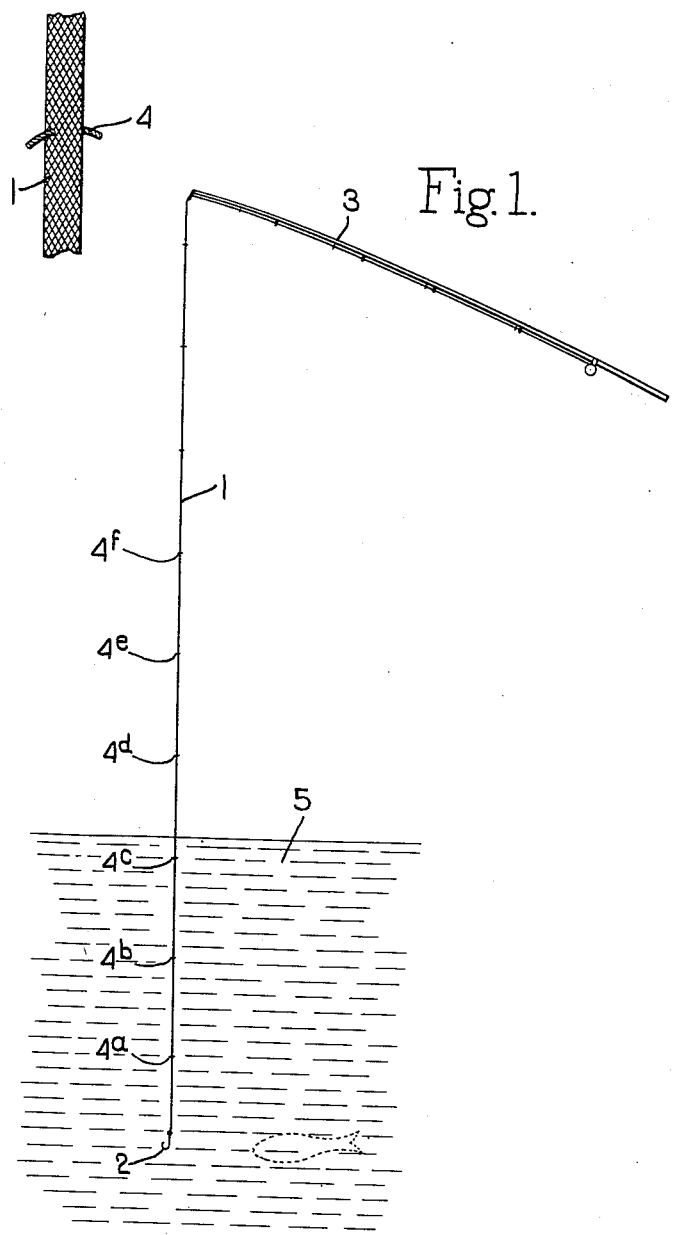

1,846,912

UNITED STATES PATENT OFFICE

ROBERT H. SEDGLEY, OF CONCORD, NEW HAMPSHIRE

FISHLINE

Application filed June 13, 1930. Serial No. 461,003.

This invention relates to fish lines and has for its object to provide a novel fish line which is provided with markers at spaced intervals along its length, the purpose of which is to assist the fisherman in determining how much of the line is under water at any particular time.

When a fisherman is fishing he frequently reels out more or less of the fish line and it is often quite difficult, if not impossible, for him to tell just how much of the line is under water except by reeling in the line again.

My present invention aims to provide a novel fish line which is provided along its length, and especially the portion which is likely to be under water more or less, with markers which can be readily seen by the fisherman and which enable him to determine at a glance just how much of the fish-line is under water. These markers may be applied in various ways and may conveniently be made of different colors although any desired construction which will give the desired indication may be employed.

In order to give an understanding of the invention I have illustrated in the drawings a selected embodiment thereof which will now be described after which the novel features will be pointed out in the appended claims.

Fig. 1 is a general view illustrating a fish line embodying my invention.

Fig. 2 is an enlarged fragmentary perspective view.

In the drawings 1 indicates a fish line having a fish hook 2 secured to one end, the fish line being carried by a fish pole 3 all as usual.

In accordance with my present invention the fish line is provided with markers 4a, 4b, 4c, 4d, etc., at spaced intervals along its length for a certain distance from the end to which the fish hook is attached. These markers may be spaced any suitable distance apart, the spacing on any line being determined somewhat by the character of fishing which is to be done with the line. For certain kinds of fishing it may be advantageous to have the markers applied every three or four feet on the line and for other kinds of fishing it may be sufficient if the markers are applied every ten feet or so. In any event, these markers will be of such a character that they may be distinguished one from the other, each marker having an individual color or individual characteristic which can be easily distinguished.

Each marker will also be at a predetermined known distance from the end of the line carrying the fish hook so that by observing which particular marker is adjacent the surface of the water the fisherman will know exactly the number of feet of the line which is under the water 5, whether the finishing is being done in still water or in a rapidly flowing stream or whether the fisherman is trolling or fishing in any other ordinary way.

As stated above, these markers may be of any desired character. They may be formed on the line 10 in some suitable way or may be built into the line. In the drawings I have shown the latter construction in which the fish line has braided into it short lengths of differently colored yarn or cord. These short lengths may be braided into the fish line as the latter is being made and they preferably project sufficiently to provide the necessary indication.

These lengths of yarn may be of different color, for instance, marker 4a may be a red color, marker 4b a blue color, marker 4c a yellow color, marker 4d a green color, etc.

By knowing the distance between the different markers and their arrangement on the line it will be very easy to determine at any time just how much of the line is under water by observing the particular marker which is nearest the surface of the water. The presence of these markers does not interfere with reeling or unreeling of the line nor with the fishing operations in any way but on the contrary the markers are a great help because they give an indication at all times as to just what length of line is under water.

While I have illustrated herein a selected embodiment of my invention I do not wish to be limited to the constructional features shown.

For convenience it may be desirable to provide a label or sticker which can be secured to the fish pole and which gives the key to the arrangement of markers. In other words, this sticker or label will indicate graphically just how far from the end of the line a marker of any particular color is.

I claim:

1. A braided fish line having markers braided into it at predetermined intervals along its length, whereby when the line is used the amount which is under water can be readily determined.

2. A braided fish line having markers in the form of short lengths of cord braided into it at predetermined intervals along its length, each marker having an individual characteristic which distinguishes it from other markers.

3. A braided fish line having short lengths of cord braided into it at predetermined intervals along its length, each length of cord extending transversely through the line and each short length of cord having a color different from that of the other short lengths.

In testimony whereof, I have signed my name to this specification.

ROBERT H. SEDGLEY.